May 27, 1930. C. H. TEESDALE 1,760,382
CONTROLLING MEANS FOR ELECTRIC SWITCHES
Filed Jan. 23, 1926
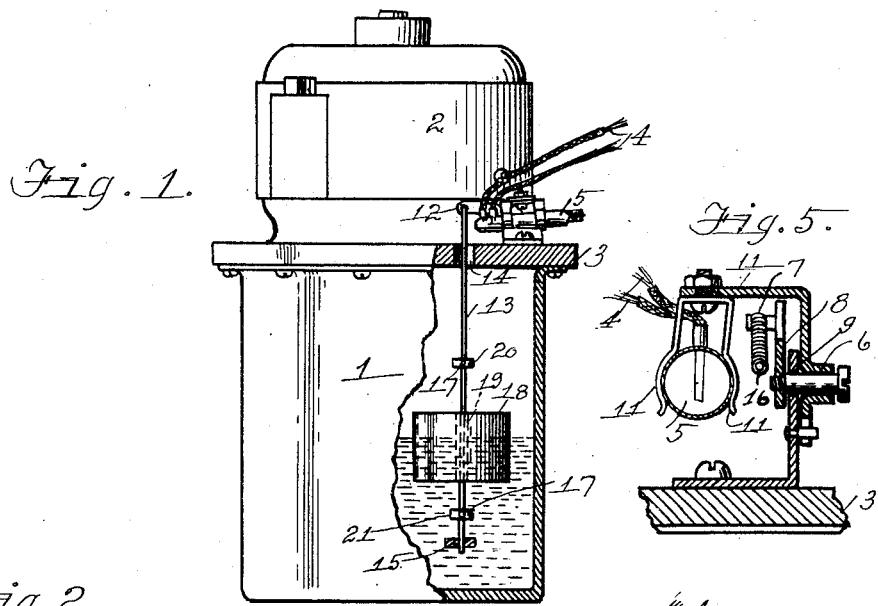
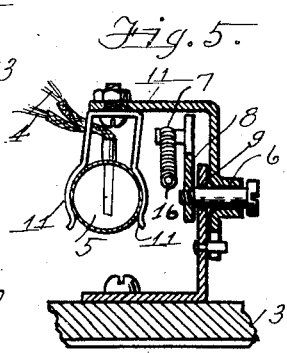
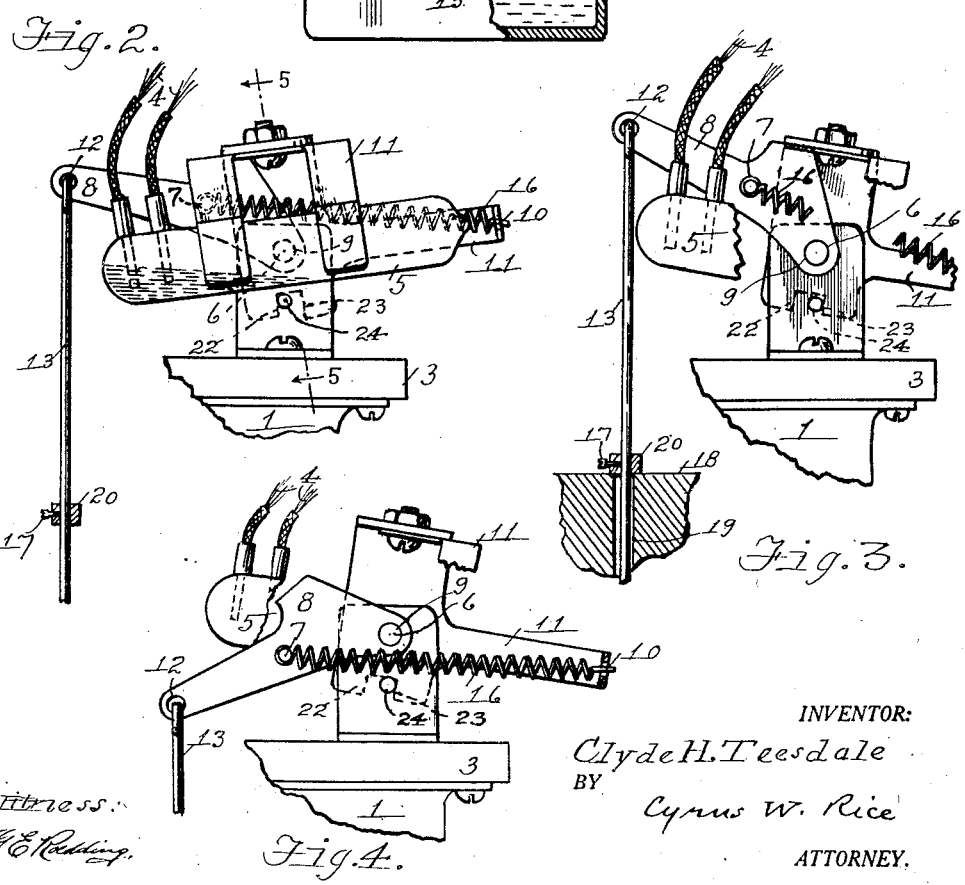
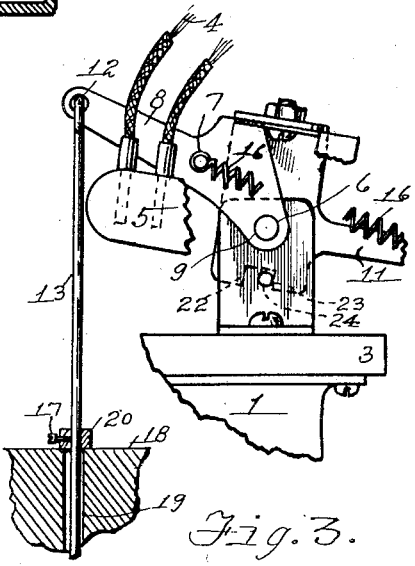
INVENTOR:
Clyde H. Teesdale
BY Cyrus W. Rice
ATTORNEY.

Patented May 27, 1930

1,760,382

UNITED STATES PATENT OFFICE

CLYDE H. TEESDALE, OF GRAND RAPIDS, MICHIGAN, ASSIGNOR TO TEESDALE MANUFACTURING COMPANY, OF GRAND RAPIDS, MICHIGAN, A CORPORATION OF MICHIGAN

CONTROLLING MEANS FOR ELECTRIC SWITCHES

Application filed January 23, 1926. Serial No. 83,327.

The present invention relates to controlling means for electric switches; and its object is, generally, to provide means of that character improved in certain respects hereinafter appearing; and more particularly, to provide a float-operated electric switch having in addition to its regular operation a safety-providing action.

These and any other objects hereinafter appearing are attained by, and the invention finds preferable embodiment in, the organization hereinafter particularly described in the body of this specification and illustrated by the accompanying drawings, in which:

Figure 1 is a side view of a vessel adapted to contain liquid and having liquid-supplying means, an electric switch for governing the operation of said means, and controlling means for the switch, the vessel being partly sectioned vertically;

Figure 2 is a side view of the switch shown in circuit-closing position;

Figure 3 is a like view of the same shown in circuit-opening position;

Figure 4 is a side view of certain parts shown in still another position; and

Figure 5 is a transverse sectional view of certain parts taken on line 5—5 of Figure 2.

In the embodiment of the invention illustrated by the accompanying drawings, an oil-containing vessel or tank 1 of oil-burning heating apparatus is shown, supplied from a suitable source (not shown) by electrically-operated means, as a pump driven by an electric motor, said pump and motor being of any usual construction and contained in a suitable housing 2 carried on the top 3 of said vessel. The electric circuit 4, containing said motor and a source of electric energy (not shown) has a circuit closer and opener or "switch" of any suitable and well known type, preferably the mercury switch 5 as shown. This switch is mounted at 6 tiltably in a vertical plane into circuit-opening position seen in Figures 3 and 4 and into circuit-closing position illustrated in Figures 1 and 2.

A spring 16 connected at 7 to an arm 8, having a swinging movement about its pivotal mounting 9, and at 10 to the switch's carrying member 11, during the normal operation of the switch extends above the pivotal mounting 6 of the switch (or its member 11) as show in Figures 2 and 3 and thus yieldingly maintains the arm 8 and the switch and its member 11 in the interrelative position seen in said views. To the free end of this arm 8 is connected at 12 a depending rod 13, extending through an opening 14 in the top of the vessel 1 and thereinto, being preferably loosely guided at 15. This rod carries stops or collars 20, 21 preferably adjustable thereon by small set screws 17. A float 18 floats on the oil in the vessel, having a movement between these stops, the rod 13 extending loosely through a vertical opening 19 in the float. The operation of this mechanical and electrical organization is as follows:

The motor being in operation, supplies oil to the vessel 1 which causes the float to rise. When the float has risen to the degree predetermined by the adjusted position of the upper stop 20, it engages this stop and moves the arm 8 and the switch with it to the position seen in Figure 3, thus opening the switch and the electric circuit, deenergizing the motor and stopping the supply of oil to the vessel. As the oil is being exhausted from the vessel, the float falls until it engages the lower stop 21 and moves the arm 8 downwardly and the switch with it to the position seen in Figure 2, thus closing the switch and electric circuit and causing the motor to resume its operation to supply oil to the vessel. The organization functions in its normal operation as above set forth; but should the oil become exhausted from the supply thereof (not shown) or should it leak from the vessel faster than the pump supplies the same thereto, or for other or accidental causes fail to be supplied to the vessel 1 in normal volume (although the motor be still in operation the float descends further than to close the circuit to cause the motor to operate, and by its continued downward movement moves the rod 13 still further downward and swings the arm 8 to the position seen in Figure which action causes the spring 16 to pass below the pivotal mounting 6 and suddenly moves the switch oppositely to said arm (i.

upwardly at its left hand end) by the well-known "snap" switch action, thus opening the switch and the circuit and causing the motor to cease running. This done, the device remains inoperative until the arm 8 is raised by hand to a position permitting the motor to resume operation.

Oppositely disposed stops 22, 23 engage the fixed projection 24 to limit the movement of the switch.

It is manifest that other means than the motor may be employed for supplying or admitting oil into vessel 1; as a valve controlling the oil intake to the vessel operated by electric means controlled by the switch.

It is evident that this invention may be utilized to operate movable parts other than an electric switch; for instance, a valve may be substituted for said switch and will be turned to the three positions in which said switch is turned, by the same means illustrated by the drawings and above described.

The invention being intended to be pointed out in the claims, is not to be limited to or by details of construction or arrangement of the particular embodiment thereof illustrated by the drawings or hereinbefore described.

I claim:

1. In an organization of the character described: a vessel adapted to contain a liquid; an electric switch; a rod operatively connected with the switch and having spaced stops; a float in the vessel having a movement between the stops, and adapted to engage in its movement in one direction one of the stops to open the switch, and to engage in its movement in the opposite direction the other stop to close the switch, and in its continued movement in the last-mentioned direction to open the switch.

2. In an organization of the character described: a vessel adapted to contain liquid; an arm having a swinging movement; an electric switch movable with the arm in a portion of the arm's movement and oppositely thereto in another portion of the arm's movement; a rod connected to the arm and having spaced stops; a float in the vessel having a movement between the stops, and adapted to engage in its movement in one direction one of the stops to move the arm and the switch therewith to open position, and to engage in its movement in the opposite direction the other stop to move the arm and the switch therewith to closed position, and in its continued movement in the last-mentioned direction to move the arm and the switch oppositely thereto to open position; means for moving the switch oppositely to the arm in said continued movement of the float.

3. In a device of the character described, a tiltable switch, a pivotal support therefor, an arm fixed to said pivotal support, a float actuated by the quantity of liquid in a container, a second arm pivotally mounted on said pivotal support and operated by said float, and connecting means between said first mentioned arm and said second mentioned arm whereby when said float rises to a predetermined high level an open circuit is obtained in said tiltable switch, when said float falls to a predetermined low level a closed circuit is obtained in said tiltable switch and when said float falls to a level lower than the first mentioned low level an open circuit is obtained in said tiltable switch.

4. In a device of the character described, switching means, an arm for operating said switching means, a float actuated by the quantity of liquid in a container, a second arm for connection with said float, and spring means for connecting said first and said second mentioned arms, said spring means being adapted to urge said arms into a biased position to open the circuit through said switching means when said float rises to a predetermined high level and being adapted to urge said arms into a second biased position to close the circuit through said switching means when said float falls to a predetermined low level, and means whereby the circuit is opened through said switching means when said float falls below said predetermined low level.

5. In a device of the character described, a tiltable switch, a pivotal support therefor, an arm fixed to said pivotal support, a float actuated by the quantity of liquid in a container, a second arm pivotally mounted on said pivotal support and operated by said float, spring means for connecting said first and said second mentioned arms, said spring means being adapted to urge said arms into a biased position to open the circuit through said tiltable switch when said float rises to a predetermined high level and being adapted to urge said arms into a second biased position to close the circuit through said tiltable switch when said float falls to a predetermined low level, and means whereby said tiltable switch is tilted to open the circuit therethrough when said float falls below said predetermined low level.

6. In a device of the character described, a tiltable switch, a pivotal support therefor, an arm fixed to said pivotal support, a float actuated by the quantity of liquid in a container, a second arm pivotally mounted on said pivotal support and operated by said float, and spring means for connecting said first and said second mentioned arms, said spring means being adapted to urge said arms into a biased position to open the circuit through said tiltable switch when said float rises to a predetermined high level and being adapted to urge said arms into a second biased position to close the circuit through said tiltable switch when said float falls to a predetermined low level, said second mentioned arm being adapted to positively engage said first mentioned arm to tilt said switch to open the circuit therethrough when said float falls below said predetermined low level.

7. In a device of the character described, a tiltable switch, a pivotal support therefor, an arm fixed to said pivotal support and having a projection thereon, a float actuated by the quantity of liquid in a container, a second arm pivotally mounted on said pivotal support and operated by said float, and spring means for connecting said first and said second mentioned arms, said spring means being adapted to urge said arms into a biased position to open the circuit through said tiltable switch when said float rises to a predetermined high level and being adapted to urge said arms into a second biased position to close the circuit through said tiltable switch when said float falls to a predetermined low level, said second mentioned arm being adapted to engage the projection on said first mentioned arm to tilt said tiltable switch and open the circuit therethrough when said float falls below said predetermined low level.

8. In a device of the class described: a container adapted to hold a liquid, a float therein, an electric switch, connecting mechanism between the float and the switch for opening the switch by the movement of the float in one direction and for closing the switch by a movement of the float in the opposite direction, and for again opening the switch by the continuing movement of the float in the last specified direction.

9. In a device of the class described: a container adapted to hold a liquid, a float therein, a movable member, connecting mechanism between the float and the movable member, for moving said member to one position by the movement of the float in one direction, and for moving said member to another position by the movement of the float in the opposite direction, and for moving said member to its first-mentioned position by continued movement of the float in the last specified direction.

10. In a device of the class described: an electric switch within an electric circuit, mechanism for operating said switch and a float connected to said mechanism for actuating said mechanism, said mechanism having two operative positions for opening the switch circuit and a third operative position for closing said switch circuit.

11. In a device of the class described: a tiltable electric switch within an electric circuit, said switch having two operative positions for breaking the circuit through said tiltable switch, a third operative position for completing the circuit through said tiltable switch, and a float adapted to actuate the switch for making and breaking a circuit in said three operative positions.

In testimony whereof I have hereunto set my hand at Grand Rapids, Michigan, this 8th day of December, 1925.

CLYDE H. TEESDALE.

DISCLAIMER 1,760,382.—*Clyde H. Teesdale*, Grand Rapids, Mich. CONTROLLING MEANS FOR ELECTRIC SWITCHES. Patent dated May 27, 1930. Disclaimer filed June 20, 1931, by the assignee, *Teesdale Manufacturing Company*.

Hereby enters this disclaimer to that part of the claims in said specification which is in the following words, to-wit:

"8. In a device of the class described: a container adapted to hold a liquid, a float therein, an electric switch, connecting mechanism between the float and the switch for opening the switch by the movement of the float in one direction and for closing the switch by a movement of the float in the opposite direction, and for again opening the switch by the continuing movement of the float in the last specified direction.

"9. In a device of the class described: a container adapted to hold a liquid, a float therein, a movable member, connecting mechanism between the float and the movable member, for moving said member to one position by the movement of the float in one direction, and for moving said member to another position by the movement of the float in the opposite direction, and for moving said member to its first-mentioned position by continued movement of the float in the last specified direction.

"10. In a device of the class described: an electric switch within an electric circuit, mechanism for operating said switch and a float connected to said mechanism for actuating said mechanism, said mechanism having two operative positions for opening the switch circuit and a third operative position for closing said switch circuit.

"11. In a device of the class described: a tiltable electric switch within an electric circuit, said switch having two operative positions for breaking the circuit through said tiltable switch, a third operative position for completing the circuit through said tiltable switch, and a float adapted to actuate the switch for making and breaking a circuit in said three operative positions."

[*Official Gazette July 7, 1931.*]